United States Patent [19]

Powers

[11] Patent Number: 5,197,914

[45] Date of Patent: Mar. 30, 1993

[54] CASING BRAKE MECHANISM FOR STUFFING APPARATUS

[75] Inventor: Richard G. Powers, Overland Park, Kans.

[73] Assignee: Marlen Research Corporation, Overland Park, Kans.

[21] Appl. No.: 873,377

[22] Filed: Apr. 24, 1992

Related U.S. Application Data

[63] Continuation-in-part of Ser. No. 818,339, Jan. 9, 1992, abandoned.

[51] Int. Cl.⁵ ............................................. A22C 11/02
[52] U.S. Cl. ........................................ 452/32; 452/33; 452/35
[58] Field of Search ..................... 452/32, 33, 34, 35, 452/36, 38

[56] References Cited

U.S. PATENT DOCUMENTS

| | | | |
|---|---|---|---|
| 4,077,090 | 3/1978 | Frey et al. | 452/37 |
| 4,358,873 | 11/1982 | Kollross | 452/37 |
| 4,417,368 | 11/1983 | Washburn | 452/37 |
| 4,430,772 | 2/1984 | Michael et al. | 452/37 |
| 4,430,773 | 2/1984 | Becker et al. | 452/37 |
| 4,437,209 | 3/1984 | Duroyon | 452/37 |
| 4,442,568 | 4/1984 | Petry | 452/37 |
| 4,599,764 | 7/1986 | Knepshield | 452/37 |
| 4,606,379 | 8/1986 | Nausedas | 452/37 |
| 4,649,602 | 3/1987 | Kupcikenicius | 452/33 |
| 4,675,945 | 6/1987 | Evans et al. | 452/32 |
| 4,847,953 | 7/1989 | Evans et al. | 452/36 |
| 5,024,041 | 6/1991 | Urban et al. | 452/32 |
| 5,035,671 | 7/1991 | Anderson et al. | 452/37 |
| 5,067,313 | 11/1991 | Evans | 452/35 |
| 5,074,386 | 12/1991 | Evans | 452/48 |
| 5,104,348 | 4/1992 | Powers et al. | 452/45 |

FOREIGN PATENT DOCUMENTS 101100 6/1962 Netherlands.
598596 3/1978 U.S.S.R.
976987 12/1964 United Kingdom.

*Primary Examiner*—Willis Little
*Attorney, Agent, or Firm*—Hovey, Williams, Timmons & Collins

[57] ABSTRACT

An improved casing brake mechanism (10) is provided for selectively engaging and braking the movement of a casing (14) applied over a casing horn (12) during filling of the casing (14). The mechanism (10) includes a pair of resilient, laterally spaced apart, obliquely oriented, annular casing-engaging rings (16, 18) which are selectively compressed and caused to engage a casing (14) by means of a thrust assembly (20) including a pair of separate, co-acting thrust elements (62, 68); the thrust elements (62, 68) are moved in a direction generally parallel with the longitudinal axis of horn (12) by means of a source of pressurized air (P). A remotely actuatable, three-position valve (80) is preferably employed, which allows alternate and selective connection to the pressurized air source (P), an atmospheric vent (A), and a source of vacuum (V). In this manner, the thrust elements (62, 68) can be selectively moved for compressing the rings (16, 18), or the operating pressure may be relieved via vent (A) or source (V). A shifting assembly (90) may be coupled with brake assembly (10) for translatory movement of the latter between a forward braking position and a rearward sealing position preventing passage of air entrapped between the casing (14) and horn (12) into the confines of the latter; an annular sealing element (92) is provided on the horn (12) which is cooperable with the braking assembly (10) when the latter is moved to its sealing position.

17 Claims, 2 Drawing Sheets

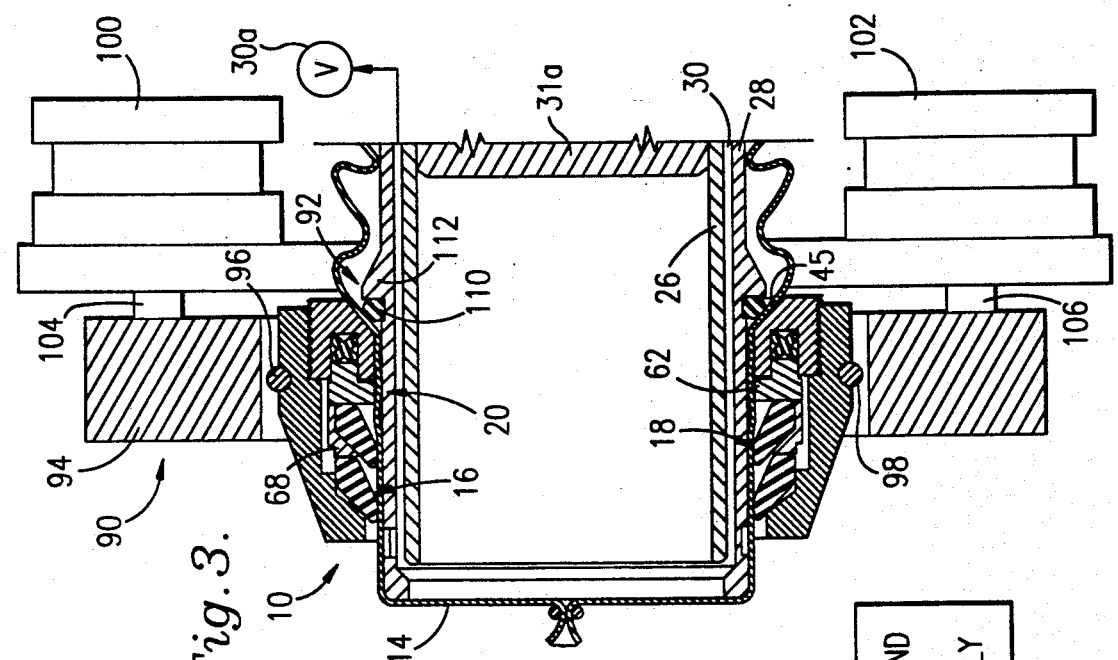
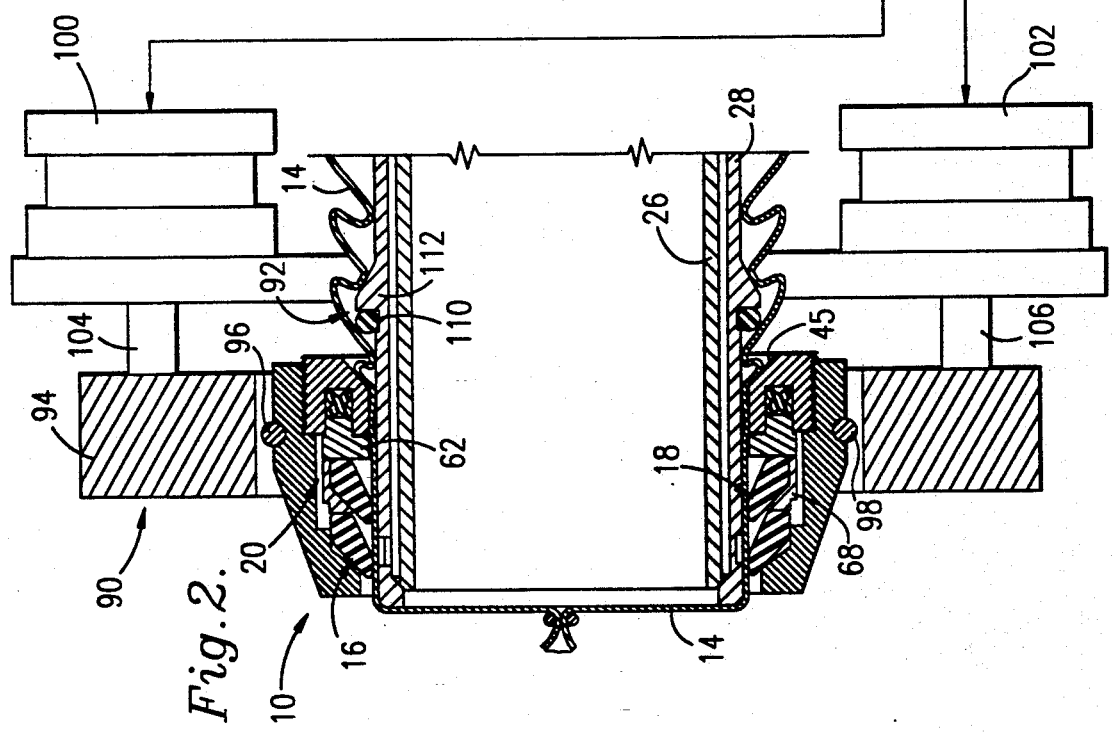

CASING BRAKE MECHANISM FOR STUFFING APPARATUS

This is a continuation-in-part of Ser. No. 818,339 filed Jan. 9, 1992, now abandoned.

BACKGROUND OF THE INVENTION

1. Field of the Invention

The present invention is broadly concerned with a casing brake mechanism used in conjunction with a stuffing horn and adapted for selective engaging and braking action against a casing applied over a tubular casing horn. More particularly, it is concerned with such a mechanism which can be remotely adjusted to vary the compressive forces exerted against the casing, thereby facilitating filling operations. In preferred forms, a pair of adjacent, obliquely oriented, resilient rings are employed, together with a fluid pressure-actuated, annular thrust ring adjacent the rearmost ring for selectively engaging the rings and causing compression thereof against the underlying casing. In order to inhibit passage of air entrapped between the casing and horn into the confines of the latter, the overall stuffing apparatus is provided with a sealing assembly adjacent the brake mechanism. The brake mechanism is selectively shiftable between a sealing position wherein the casing is compressed against a sealing member in order to inhibit flow of entrapped air into the confines of the casing, and a braking position serving to control the passage of casing off the horn during stuffing.

2. Description of the Prior Art

Comminuted and whole muscle meat products (e.g., sausages, bolognas, hams and beef briskets) are often placed within protective casings for sale to the consuming public. To this end, sizing equipment is employed which has an elongated, tubular casing horn together with meat-conveying pump means for feeding the meat products into the rear end of the horn. A casing is placed over the forward open end of the horn to receive meat product as it emerges from the open horn end. Conventional clippers are typically used to close the ends of the casing during such filling operations.

A persistent problem with sizing equipment of this type is the need to "brake" the casing as it is being filled, in order to prevent too rapid movement of the casing off the casing horn. Without such a braking mechanism, the finished casing will often be loosely filled with product, which is unacceptable both from an aesthetic and sanitary viewpoint.

In response to this problem, it has been known to provide casing brakes having a segmented annular metallic ring adapted to fit over a casing horn, along with a "quad" resilient ring as a backing member. A source of pressurized air is used which acts against the quad ring in turn compressing the metallic ring against a casing, see e.g., U.S. Pat. No. 5,035,671. This type of casing ring has proved to be deficient in that the metallic ring does not provide the desired degree of adjustable braking action; moreover, the flattened ring surface can cause tearing or splitting of a casing.

Another type of known brake mechanism as described in U.S. Pat. Nos. 4,847,953 and 4,675,945 employ resilient casing rings, with radial adjustment thereof being made by a threaded section which must be manually manipulated. These systems suffer from the fact that the rings often do not properly seat or "shoulder out" against a casing. Furthermore, the necessity of manual adjustment, in the region of the sizer adjacent the clippers, presents a hazard to equipment operators.

Accordingly, there is a real and unsatisfied need in the art for an improved casing brake mechanism which not only provides an infinitely adjustable brake so that casing movement can be accurately controlled, but which can also be readily adjusted from a remote location.

SUMMARY OF THE INVENTION

The present invention overcomes the problems outlined above, and provides a casing brake mechanism for selectively engaging and braking a casing positioned over an elongated, tubular casing horn. Broadly speaking, the mechanism of the invention includes a resilient, annular ring positioned about a casing horn and adapted to engage a casing thereover. A thrust element is also provided adjacent the ring and presenting a ring-engaging face and a remote trailing face. The overall mechanism further includes means for selectively moving the thrust element in a direction generally parallel with the longitudinal axis of the casing horn for alternately compressing the ring and causing the same to engage an underlying casing, and for releasing the ring. Such selective movement is afforded by means including a source of pressurized fluid operable for selectively acting against the trailing face of the thrust element in order to effect ring compression, and to relieve such pressure.

In preferred forms of the invention, a pair of juxtaposed, obliquely oriented rings are employed, together with a two-part annular thrust assembly. The thrust assembly is alternately connectable, via a valve, to a source of pressurized air, an atmospheric vent and a vacuum source. In this way, the operator may, from a remote location, selectively apply pressurized air for effecting tighter engagement between the rings and an underlying casing; moreover, such pressure may be relieved as needed (either totally or incrementally) through venting to the atmosphere or to the vacuum source.

In another embodiment, a stuffing apparatus is provided of the type including an elongated, tubular stuffing horn adapted to receive casing thereover which is successively stuffed with portions of material to form individual casings. Such stuffing apparatus further includes mechanism such as a pump or the like for feeding individual portions of material into successive casing sections, including a piston reciprocal between a retracted position allowing portions of the material to pass into the horn, and a forward position within the horn wherein the portions are stuffed into corresponding casing sections. Such apparatus is improved in accordance with the invention by provision of a casing brake assembly of the type described, together with an annular sealing element separate from the brake assembly and extending circumferentially about the horn to present a radially outwardly extending sealing surface. Means is further provided for selectively axially shifting the braking assembly between a sealing position wherein the assembly compresses the casing against the sealing surface during retraction of the piston from the horn. This prevents air entrapped between the casing and the horn from passing into the interior of the horn and degrading product quality. The braking assembly is also selectively shiftable to a forward braking position wherein the assembly is spaced from the sealing surface and the braking ring engages the casing for control thereof.

BRIEF DESCRIPTION OF THE DRAWINGS

FIG. 2 is a vertical sectional view similar to that of FIG. 1, but illustrating the casing brake mechanism equipped with structure for selective translation of the brake assembly between a rearward sealing position and a forward braking position, and wherein the casing brake is in the forward position thereof; and FIG. 3 is a view similar to that of FIG. 2, but depicting the brake assembly in its rearward sealing position during retraction of the piston from the stuffing horn, in order to inhibit passage of entrapped air into the confines of the stuffing horn.

DETAILED DESCRIPTION OF THE PREFERRED EMBODIMENTS

Figure 1:
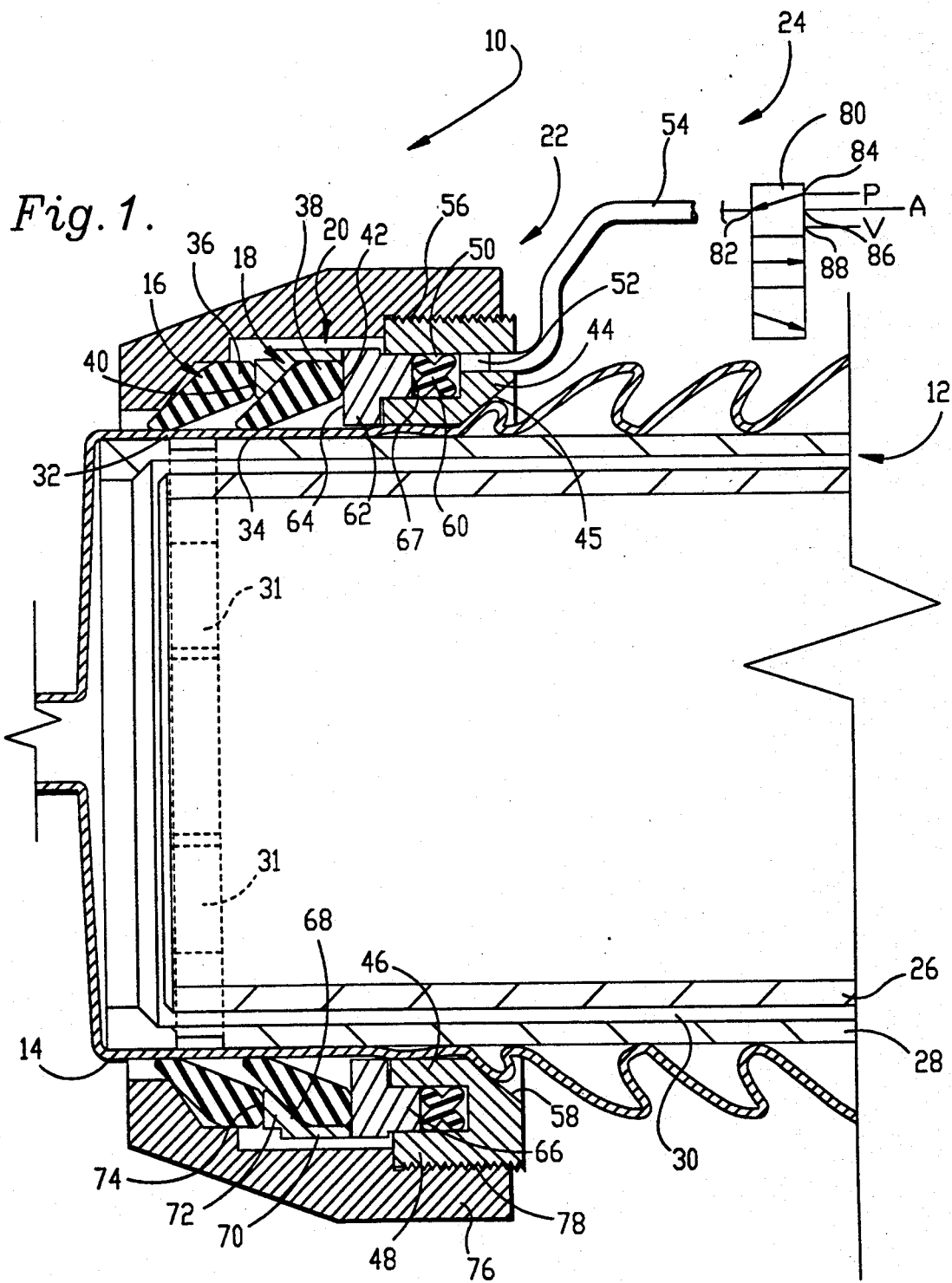
FIG. 1 is a vertical sectional view of the casing brake mechanism of the invention, shown in its operative orientation about a casing horn and engaging a casing applied over the horn.

Turning now to the drawing, a casing brake mechanism 10 is illustrated, in its operative disposition disposed about a casing horn 12, the latter having a supply of conventional casing 14 applied over the open end thereof. The mechanism 10 broadly includes a pair of resilient annular casing rings 16, 18, a two-part thrust assembly 20, a retaining assembly 22, and a motive assembly 24 for selective movement of the thrust assembly 20 as will be described.

In more detail, the casing horn 12 is of the type described in U.S. Pat. No. 5,104,348, entitled Sizer Apparatus Having Shiftable Horn; this patent is incorporated by reference herein. Generally speaking, however, the horn 12 includes telescopically interfitted, inner and outer tubular horn members 26, 28 having an annular evacuation region 30 therebetween, the latter communicating with a vacuum pump 30a (FIG. 3) which constantly operates during stuffing operations to evacuate air from the region 30 and the interior of inner member 26. The outer horn 28 includes a plurality of circumferentially spaced openings or slots 31 communicating with the region 30 which facilitate evacuation of entrapped air from the casing 14 as filling proceeds. The inner horn 26 is moreover axially shiftable to a limited degree during use of the horn 12, in order to permit evacuation of air entrapped within inner member 26 and region 30. A pump or other appropriate meat-conveying device (not shown) is operatively coupled to the remote end of horn 12 for selectively feeding successive portions of meat product into inner horn member 26. A piston 31a (FIG. 3) is reciprocal within the horn 12 between a fully retracted position permitting filling of the horn with a portion of product, to a forward stuffing position for ejecting the portion into a section of the casing 14. Clippers (again not shown) are employed for closing the ends of casing sections at the beginning and end of each filling cycle to create individual stuffed portions.

The casing 14 applied over the open end of horn 12 is entirely conventional, and is in the form of flexible, tubular material which can be loosely positioned over the horn as illustrated. Normally, a relatively long length of the casing 14 is applied over the horn 12, and successive sections of the casing are then used during each stuffing cycle.

Each of the casing rings 16, 18 is formed of a resilient, synthetic resin material (e.g., neoprene rubber) and includes an innermost, gently arcuate, casing-engaging surface 32, 34, and an enlarged outboard shoulder portion 36, 38. The rings 16, 18 are positioned in juxtaposed relationship, with each being obliquely oriented, i.e., the shoulder portion of each ring is both laterally and radially spaced from the corresponding casing-engaging surface thereof. It will further be observed that each shoulder portion 36, 38, includes a corresponding rearmost surface 40, 42 which is generally transverse to the longitudinal axis of horn 12.

The thrust assembly 20 includes a rearmost, annular metallic fixture 44 presenting a rear beveled surface 45, and a pair of radially spaced apart, forwardly extending projections 46, 48 which cooperatively define therebetween an annular fluid chamber 50. The fixture is also provided with a passageway 52 receiving a conduit 54. The outermost surface of fixture 44 is threaded as at 56, and the fixture body has a rearmost chamfered face 58 permitting smooth passage of the casing 14 thereunder. A flexible "quad" ring 60 is positioned within chamber 50 for purposes to be made clear.

The thrust assembly 20 also includes an annular metallic body 62 presenting a forward surface 64 perpendicular with the longitudinal axis of horn 12 and adapted to engage the surface 42 of rearward ring 38; the body 62 also has a rearwardly extending annular trailing leg 66 having a trailing face 67 which closely fits between the projections 46, 48 of fixture 44 and is slidable therebetween. In addition, a second annular metallic thrust member 68 is provided having a forwardly extending segment 70 and an inwardly extending, somewhat triangularly shaped portion 72, the latter presenting a ring-engaging surface 74 which is perpendicular to the longitudinal axis of horn 12. As illustrated, the surface 74 is adapted to abut and engage the surface 40 of ring 16. The thrust member 68 is slightly separated from the body 62, but is engageable by the latter during operation of the mechanism 10 as will be described.

The retaining assembly 22 includes an outermost, irregularly shaped, annular retainer 76 designed to overlie the rings 16, 18, fixture 44 and thrust assembly 20. The primary purpose of the retainer 76 is to maintain the relative positions of these components while permitting limited movement thereof during operation of the brake mechanism. It will be observed that the retainer 76 has an inner threaded section 78 which threadably mates with threading 56 of fixture 44, thereby interconnecting these components. The retainer 76 is normally affixed to guide rod(s) or similar structure permitting fore and aft adjustment of the entire brake mechanism 10 as necessary. An exemplary arrangement of this type is illustrated in U.S. Pat. No. 5,035,671, which is incorporated by reference herein.

The motive assembly 24 includes a three-position, solenoid operated valve 80 depicted schematically in FIG. 1. The valve has an input 82 connected with conduit 54, and three outputs 84, 86, and 88. Output 88 is connected to a source of pressurized air P, whereas output 86 is connected to an atmospheric vent A and output 88 is connected to a source of vacuum V. The valve 80 may be operated from a remote position through appropriate electrical leads to the operating solenoid thereof, in order to selectively and alternately communicate input 82 to one of the outputs 84–88.

It may be also be advantageous to use a two-position valve having outputs only for a source of pressurized air and a vacuum source, eliminating the atmospheric vent altogether.

In the use of mechanism 10 as depicted in FIG. 1 during a casing filling operation, the leading section of casing 14 is in place over the open end of horn 12 with the leading end of the casing section clipped, and the mechanism 20 is located close to the open end of the horn. Preferably, the rings 16, 18 are located on opposite sides of the horn slots 31, and the vacuum pump 30a is operating. In addition, the horn 26 is filled with a portion of product to be stuffed. Forward travel of the piston 31a thereby initiates stuffing of the casing section, causing the latter to be pulled leftwardly as viewed in FIG. 1. In order to brake this movement, thereby insuring smooth filling operations and proper filling of the casing section, the operator would normally shift valve 80 so that input 82 thereof is communicated with output 84, i.e., the source of pressurized air P is placed in communication with chamber 50 of fixture 44. This causes compression of quad ring 60, which in turns acts against the trailing face 67, urging the body 62 leftwardly to compress casing ring 18. This causes the ring 18 to more tightly engage the casing 14 as illustrated. Furthermore, movement of the body 62 and compression of the rearward ring 18 causes the surface 64 of body 62 to engage the rearmost surface of the segment 70. This in turn causes leftward movement of the thrust member 68, so that the surface 74 thereof engages the corresponding surface 40 of outer ring 16. In this fashion both rings 16 and 18 are caused to compressively engage the casing 14 to slow and guide the outward movement of the casing section during filling thereof. It will of course be understood that the source of pressurized air P may also be variable so that the operator may selectively apply pressurized air of variable pressure to the chamber 50.

At the end of the filling operation, the operator would again remotely actuate valve 80, in order to communicate input 82 thereof with atmospheric vent A or vacuum source V. In the case of atmospheric venting, the pressurized air within chamber 50 is of course relieved to the atmosphere, thereby allowing quad ring 60 to relax and the thrust members 62, 68 to shift rightwardly under the influence of resilient rings 16, 18. More rapid evacuation of the chamber 50, with more rapid return movement of the mechanism 10 to its rest position, may be accomplished by communicating input 82 with vacuum source V.

When the casing 14 is completely filled with meat product, the brake mechanism is relaxed and the trailing end of the casing section is clipped and cut, thus leaving the next succeeding section of casing ready for filling.

In the use of the FIG. 1 embodiment, it was noted that in some instances air entrapped between the casing 14 and outer horn member 28 could be drawn into the confines of inner tubular member 26 by virtue of the suction created during retraction of piston 31a. In an attempt to overcome this problem, the motive assembly 24 was operated so as to exert considerable force on the rings 16, 18. While this expedient largely eliminated the problem of air entry, often the rings 16, 18 would not sufficiently relax after application of force thereagainst to permit smooth withdrawal of casing. This phenomenon tended to slow the operation of the stuffing apparatus and was therefore troublesome.

In order to overcome this problem, the brake mechanism 10 may be equipped with a shifting assembly broadly referred to by the numeral 90, and outer horn member 28 includes a sealing element 92 (see FIGS. 2-3). The shifting assembly 90 is operably for selectively shifting the assembly 10 between a sealing position wherein the assembly 10 compresses casing 14 against the sealing element 92 during retraction of piston 31a from horn member 26. This prevents air entrapped between casing 14 and the outer surface of casing member 28 from passing into the interior of horn member 26. The shifting assembly 90 is also operable to move the braking assembly 10 away from sealing element 92 and into a braking position for control of movement of casing 14 off of the horn 12.

In more detail, it will be seen that the shifting assembly 90 includes a metallic frame 94 disposed about the assembly 10. Connecting pins 96, 98 operably secured to the retainer 76 serve to connect the entire assembly 10 to frame 94.

A pair of pneumatic piston and cylinder assemblies 100, 102 are operably secured to the frame 94 as shown, and include extensible piston rods 104, 106 connected to the frame.

The assemblies 100, 102 are controlled in their operation by means of a timer and valve assembly 108. It will be appreciated that the assemblies 100, 102, in the extended positions thereof depicted in FIG. 2, locate the brake assembly 10 in the forward braking position thereof, while retraction of the rods 104, 106 moves the assembly 10 to its rearward sealing position illustrated in FIG. 3.

The sealing element 92 includes a resilient elastomeric O-ring 110 disposed about the outer surface of horn member 28. The latter includes a radially outwardly extending integral backstop 112 providing mechanical support for the O-ring 110 and preventing rearward translation thereof. The O-ring 110 is oriented to present an engagement surface adapted to engage the beveled surface 45 when assembly 10 is shifted to its sealing position.

The operation of the embodiments of FIGS. 2-3 will now be described, assuming that the piston 31a is in its forwardmost position adjacent the outlet of horn member 26, and the outer end of the casing 14 is clipped. As the piston 31a is withdrawn towards its retracted position, the assembly 108 is operated so as to retract the piston and cylinder assemblies 100, 102, thereby moving the brake assembly 10 to its sealing position. Movement of the braking assembly to its sealing position prevents air entrapped between casing 14 and horn member 28 from passing into inner horn member 26. At this same time, the inner horn member 26 is shifted leftwardly as viewed in FIG. 3 relative to the outer horn member 28.

When the piston is fully retracted, the product pump is started and a portion of product is pumped into inner horn member 26. Simultaneously with initiation of operation or the product pump, the secondary timer associated with assembly 108 is started. This timer is set so that it times out at a time just prior to complete filling of the horn 26 with product, i.e., immediately prior to the time when material begins to engage the outermost end of casing 14. When the secondary timer times out, the piston and cylinder assemblies 100, 102 are operated thereby moving the brake assembly 10 to its forward, FIG. 2 position. At this point, motive assembly 24 may be adjusted to increase or decrease the pressure exerted on casing 14 by the rings 16, 18, if necessary.

The piston 31a is next moved forwardly into horn member 26, thereby expelling the portion of product within the horn outwardly and into the casing. This serves to pull the casing leftwardly as viewed in FIGS. 2 and 3, such action being controlled via brake assembly 10. The casing is then completed by stretching and clipping thereof, leaving the next casing section ready for receipt of the next succeeding product portion.

I claim:

1. A casing brake mechanism adapted for selectively engaging and braking a casing positioned over an elongated, tubular casing horn presenting a longitudinal axis, said mechanism comprising:

a resilient annular ring positioned about said horn and including an inner surface for engaging said casing, and an opposed, outer, enlarged shoulder region;

a substantially rigid, annular retainer disposed about said ring and including an inner face proximal to said shoulder region;

a movable thrust element adjacent said ring and presenting a first ring-engaging face and a second trailing face remote from said ring-engaging face; and means for selectively moving said thrust element in a direction generally parallel with said horn longitudinal axis for alternately compressing said ring and causing the ring to engage said casing, and for releasing said ring, said thrust element being movable relative to said annular retainer, said element-moving means including a source of pressurized fluid for selective action against said trailing face in order to effect said ring compression, and means for selectively relieving pressure exerted against said trailing face.

2. The casing brake mechanism of claim 1, said thrust element being located adjacent said shoulder region for engaging the same.

3. The casing brake mechanism of claim 1, including first and second juxtaposed, resilient annular rings respectively positioned about said horn for simultaneously engaging said casing thereover, said thrust element being located adjacent said first ring, there being thrust means for engaging said second ring, said thrust means being movable with said thrust element.

4. The casing brake mechanism of claim 1, said thrust element comprising an annular body with the ring-engaging face thereof generally transverse to said longitudinal axis, said body including a trailing leg presenting said trailing face, there being an annular, chamber-defining fixture slidably receiving said leg for guiding the movement of said thrust element, said source of pressurized fluid communicating with said chamber.

5. The casing brake mechanism of claim 4, including an annular resilient compression ring situated within said chamber of said fixture for engaging said trailing face under the influence of said pressurized fluid.

6. The casing brake mechanism of claim 1, said element moving means including:
said source of pressurized fluid;
atmospheric vent means;
a vacuum source; and
valve means operatively coupled with said source of pressurized fluid, vent means and vacuum source for selectively and alternately coupling each of the same with said element trailing face.

7. In stuffing apparatus including an elongated tubular stuffing horn adapted to receive casing thereover to be successively stuffed with portions of material to form individual casings thereof, means for feeding individual portions of said material into successive sections of said casing material including a piston reciprocal between a retracted position allowing a portion of the material to pass into the horn, and a forward position within the horn is stuffed into a casing section, the improvement which comprises:

a casing brake assembly including
a resilient annular braking ring positioned about said horn for engaging said casing thereover;
a thrust element adjacent said braking ring and presenting a first ring-engaging face and a second remote trailing face; and
means for selectively moving said thrust element in a direction for compressing the braking ring to engage said casing and for alternately releasing the ring;

an annular sealing element separate from said brake assembly and extending circumferentially about the horn to present a radially outwardly extending sealing surface; and means for selectively axially shifting said braking assembly between a sealing position wherein the assembly compresses the casing against said sealing surface during retraction of said piston from said horn in order to prevent air entrapped between the casing and horn to pass into the interior of the horn, and a braking position wherein the braking assembly is spaced from said sealing surface and said braking ring is in engagement with said casing for braking thereof.

8. The stuffing apparatus of claim 7, including means for evacuation of air entrapped between said casing and horn.

9. The stuffing apparatus of claim 7, said shifting means being operable for shifting said braking assembly from said braking to said sealing position thereof during retraction of said piston and for return shifting of the braking assembly from the sealing to the braking position thereof just prior to complete filling of said horn with a portion of material.

10. The stuffing apparatus of claim 9, including a timer forming a part of said shifting means for controlling the return shifting of the braking assembly.

11. The stuffing apparatus of claim 7, said sealing element comprising a resilient O-ring disposed about said horn upstream of the end thereof, said brake assembly being located between said O-ring and said horn end.

12. The stuffing apparatus of claim 7, said thrust element-moving means including a source of pressurized fluid for selective action against said trailing face in order to effect said ring compression, and means for selectively relieving the fluid pressure exerted against said trailing face.

13. The stuffing apparatus of claim 12, said ring presenting an inner casing-engaging surface and an outer, enlarged shoulder region, said thrust element being located adjacent said shoulder region for engaging the same.

14. The stuffing apparatus of claim 13, including first and second juxtaposed, resilient annular rings respectively positioned about said horn for simultaneously engaging said casing thereover, said thrust element being located adjacent said first ring, there being thrust means for engaging said second ring, said thrust means being movable with said thrust element.

15. The stuffing apparatus of claim 12, said thrust element comprising an annular body with the ring-engaging face thereof generally transverse to said longitudinal axis, said body including a trailing leg presenting said trailing face, there being an annular, chamber-defining fixture slidably receiving said leg for guiding the movement of said thrust element, said source of pressurized fluid communicating with said chamber.

16. The stuffing apparatus of claim 15, including an annular resilient compression ring situated within said chamber of said fixture for engaging said trailing face under the influence of said pressurized fluid.

17. The stuffing apparatus of claim 12, said thrust element moving means including:
  said source of pressurized fluid;
  atmospheric vent means;
  a vacuum source; and
  valve means operatively coupled with said source of pressurized fluid, vent means and vacuum source for selectively and alternately coupling each of the same with said element trailing face.

* * * * *